(12) United States Patent
Bultel (10) Patent No.: US 9,963,250 B2
(45) Date of Patent: May 8, 2018

(54) PROPULSION BAY

(71) Applicant: CENTRE NATIONAL D'ETUDES SPATIALES, Paris (FR)

(72) Inventor: Pascal Bultel, Pontault-Combault (FR)

(73) Assignee: CENTRE NATIONAL D'ETUDES SPATIALES (FR)

( * ) Notice: Subject to any disclaimer, the term of this patent is extended or adjusted under 35 U.S.C. 154(b) by 168 days.

(21) Appl. No.: 14/346,098

(22) PCT Filed: Sep. 20, 2012

(86) PCT No.: PCT/EP2012/068490
§ 371 (c)(1),
(2) Date: Jul. 7, 2014

(87) PCT Pub. No.: WO2013/041598
PCT Pub. Date: Mar. 28, 2013

(65) Prior Publication Data
US 2015/0001347 A1    Jan. 1, 2015

(30) Foreign Application Priority Data

Sep. 20, 2011    (FR) .................................... 11 58366

(51) Int. Cl.
*B64G 1/40*        (2006.01)
*B64G 1/42*        (2006.01)
(Continued)

(52) U.S. Cl.
CPC ................. *B64G 1/40* (2013.01); *B64G 1/42* (2013.01); *B64G 1/422* (2013.01); *B64G 1/443* (2013.01);
(Continued)

(58) Field of Classification Search
CPC .......... B64G 1/002; B64G 1/40; B64G 1/405; B64G 1/42; B64G 1/64; B64G 1/641
See application file for complete search history.

(56) References Cited

U.S. PATENT DOCUMENTS 5,350,137 A * 9/1994 Henley ................ B64G 1/1085
244/158.1
5,984,235 A * 11/1999 Snowhook ............. B64G 1/007
244/171.3

(Continued)

FOREIGN PATENT DOCUMENTS

EP    0665162 A1    8/1995

OTHER PUBLICATIONS

Tackett, S. (Feb. 20, 2013). The Cassini-Huygens Mission to Saturn. Retrieved Dec. 3, 2015, from ANS Nuclear Cafe: http://ansnuclearcafe.org/2013/02/20/cassini-hygens-mission-to-saturn/.*

(Continued)

*Primary Examiner* — Tien Q Dinh
*Assistant Examiner* — Aaron M Rodziwicz
(74) *Attorney, Agent, or Firm* — Lerner, David, Littenberg, Krumholz & Mentlik, LLP (57) ABSTRACT

This invention relates to a propulsion bay to be transported, at least temporarily, in a space launch vehicle and comprising an adapter that co-operates with at least one system located, at least temporarily, on board the bay, said system comprising an electrical power supply. The bay is characterized in that it also comprises at least one electric space propulsion engine that can be powered by the power supply of the system.

3 Claims, 11 Drawing Sheets

(51) Int. Cl.
*B64G 1/64* (2006.01)
*B64G 1/44* (2006.01)
*B64G 1/00* (2006.01)
*B64G 1/24* (2006.01)
*B64G 1/50* (2006.01)

(52) U.S. Cl.
CPC ............... *B64G 1/64* (2013.01); *B64G 1/641* (2013.01); *B64G 1/007* (2013.01); *B64G 1/242* (2013.01); *B64G 1/405* (2013.01); *B64G 1/406* (2013.01); *B64G 1/428* (2013.01); *B64G 1/44* (2013.01); *B64G 1/503* (2013.01)

(56) References Cited

U.S. PATENT DOCUMENTS

| | | | | |
|---|---|---|---|---|
| 6,296,206 | B1* | 10/2001 | Chamness | B64G 1/00 244/173.3 |
| 6,543,724 | B1* | 4/2003 | Barnett | B64G 1/443 244/172.6 |
| 6,565,043 | B1* | 5/2003 | Wittmann | B64G 1/242 244/169 |
| 8,002,219 | B2* | 8/2011 | Camarda | B64G 1/40 244/171.3 |
| 8,511,617 | B2* | 8/2013 | Caplin | B64G 1/1085 244/158.1 |
| 8,789,797 | B2* | 7/2014 | Darooka | B64G 1/10 244/159.4 |
| 2005/0109878 | A1 | 5/2005 | Cruijssen et al. | |
| 2012/0210808 | A1* | 8/2012 | Balemboy | B64G 1/105 73/866.5 |

OTHER PUBLICATIONS

French Preliminary Search Report for Application No. FR 1158366 dated Apr. 12, 2012.

Hermel J et al: "Modular, Ion-Propelled, Orbit-Transfer Vehicle", Journal of Spacecraft and Rockets, American Institute of Aeronautics and Astronautics, Reaston, VA, US, vol. 25, No. 5, Sep. 1, 1988, pp. 368-374, XP000030180.

International Search Report for Application No. PCT/EP2012/068490 dated Oct. 11, 2012.

\* cited by examiner

PROPULSION BAY

CROSS REFERENCE TO RELATED APPLICATIONS

The present application is a national phase entry under 35 U.S.C. § 371 of International Application No. PCT/EP2012/068490, filed Sep. 20, 2012, published in French, which claims priority from French Patent Application 1158366, filed Sep. 20, 2011, the disclosures of which are incorporated by reference herein.

The present invention concerns a propulsion bay intended to be transported, at least temporarily, in a space launch vehicle, comprising an adapter that cooperates with at least one system loaded at least temporarily on board the bay, the system comprising an electric power supply.

STATE OF THE ART

Figure 1:
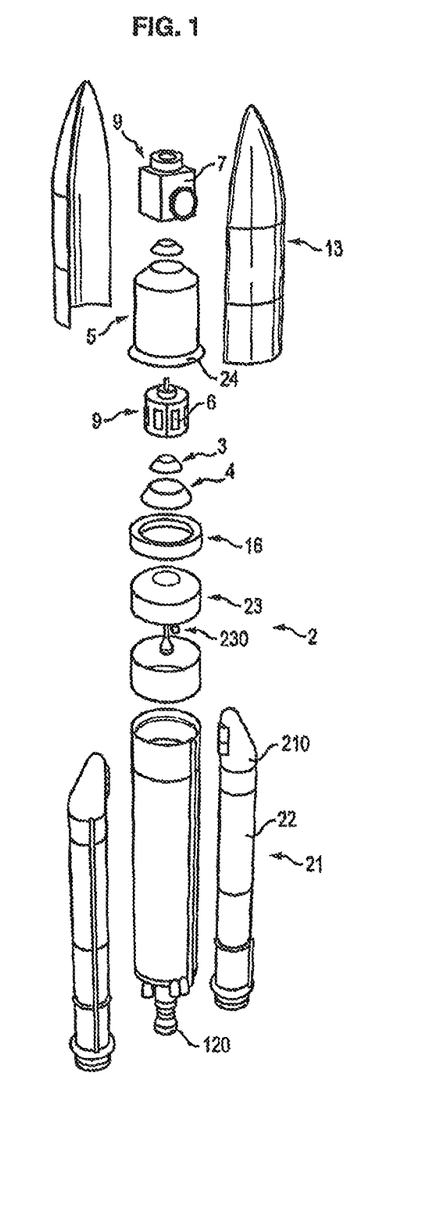
FIGS. 1 and 2, already commented upon, schematically illustrate a known launch vehicle and its launch mode respectively.

As shown in FIG. 1, space launch vehicles 2 are known for the transporting at least temporarily of at least one equipment bay 16 on which equipment 6 or 7 and propulsion means 230 are secured.

The equipment bay 16 comprises an adapter 3, 4 that cooperates with at least the system 6 loaded on board the bay 16 at least temporarily. The system 6 loaded on board generally forms an artificial satellite.

To send the system 6 into space and place it on orbit, the launch vehicle 2 conventionally comprises several stages, namely:
- a lift-off stage 21 comprising boosters 210, with known solid-fuelled propulsion;
- a lower cryogenic stage 22 comprising an engine 220 with known liquid-fuelled propulsion;
- an upper cryogenic stage 23 comprising an engine 230 with known liquid-fuelled propulsion; and
- a launch stage 24 inside which the system 6 is located protected by a fairing 13.

Figure 2:
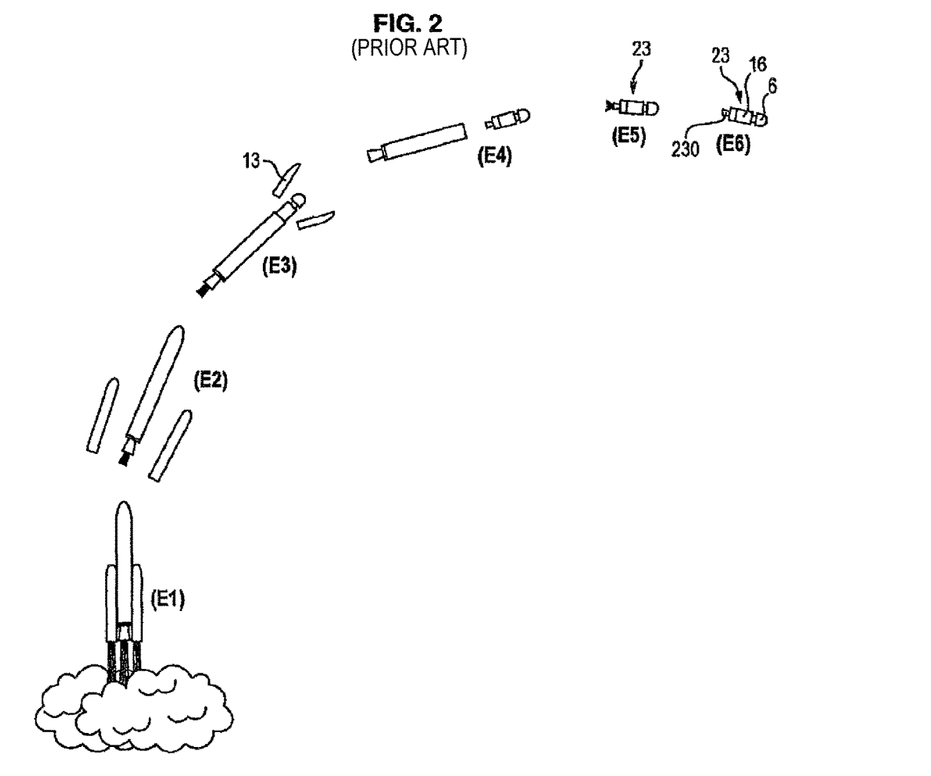

It can be seen in FIG. 2 that the stages 21 and 22 are first ignited (E1) for lift-off of the launch vehicle 2 and that subsequently only stage 22 is maintained (E2) when leaving the earth's atmosphere (stage 21 then separates from stage 22). The fairing 13 is then separated (E3) from the launch vehicle 2 since it is heavy (typically 1.7 tonnes) and henceforth of no use (at an altitude of about 69 km there is no longer any atmosphere), then the stage 23 takes over propulsion (E5) after a step (E4) to separate from stage 22. The system 6 is later separated from the equipment bay 16 once the engine 230 of stage 23 has been cut off (E6), and it is placed on orbit.

The preceding known technique has disadvantages however.

The engine 230 of stage 23 is an engine with liquid propellant, and has little flexibility of use (any operational cut-off is definitive). Since the engine 230 uses chemical fuel the payload of the launch vehicle 2 (i.e. the equipment intended to fulfil a determined mission (in particular the systems 6 and 7) that is transported by the launch vehicle 2 (and in particular by the equipment bay 16)) is limited and can only be injected onto a single orbit.

PRESENTATION OF THE INVENTION

With the invention it is possible to overcome at least one of these disadvantages.

For this purpose, according to a first aspect, the invention proposes a propulsion bay intended to be transported at least temporarily in a space launch vehicle, comprising: an adapter which cooperates with at least one system loaded on board the bay at least temporarily, the system having an electricity power supply.

The propulsion bay of the invention is characterized in that it further comprises at least one electric space propulsion engine adapted to be powered by the power supply of the system.

According to the first aspect the invention is advantageously completed by the following characteristics taken alone or in any possible technical combination thereof:
- the adapter comprises a carrier structure having an inner space to receive a first system loaded on board in the inner space;
- the carrier structure comprises one end which cooperates with a second system loaded on board;
- the first system and/or the second system form artificial satellites;
- the carrier structure has openings adapted for deployment of solar panels to power a first system forming an artificial satellite, via the openings;
- the adapter is adapted for cooperation with a third system on board forming an additional liquid or solid space propulsion system.

According to a second aspect, the invention proposes an assembly characterized in that it comprises: a propulsion bay intended to be transported at least temporarily in a space launch vehicle, comprising: a carrier structure having an inner space, at least one electric space propulsion engine adapted to be powered by an electric power supply; and a first system forming an artificial satellite loaded on board at least temporarily in the inner space of the carrier structure and having an electric power supply adapted to power the electric engine of the bay.

The invention according to the second aspect is advantageously completed by the following characteristics taken alone or in any possible technical combination thereof:
- the electric power supply comprises solar panels and the carrier structure has openings adapted for deployment of the solar panels;
- the electric power supply comprises a nuclear generator;
- the bay comprises an on-board system forming an additional liquid or solid space propulsion system.

The invention has numerous advantages.

Compared with the known prior art presented in the introductory part of the present application, the invention makes provision for an additional propulsion bay.

With the invention it is therefore possible to provide propulsion that has flexibility of use, since it uses at least one electric space propulsion engine, of low thrust but having very good performance.

The invention allows mutualisation of resources within the launch vehicle, since it allows the use of the electric power supply of a system loaded on board on the bay to power the aforementioned electric engine of the bay: the gain in weight on the bay can therefore be converted to an increase in payload.

With the invention it is therefore possible to increase the payload of the launch vehicle, and in particular to increase the weight of the systems loaded on board the bay, in particular the weight of the artificial satellites.

PRESENTATION OF THE FIGURES

Other characteristics, objectives and advantages of the invention will become apparent from the following description which is solely illustrative and non-limiting, and is to be read in connection with the appended drawings in which.

In all the Figures similar parts carry the same reference numbers.

DETAILED DESCRIPTION

FIGS. 3 to 14 schematically illustrate one possible embodiment of a propulsion bay 1 according to the invention.

The bay 1 is intended to be housed in a launch vehicle 2.

Compared with the launch vehicle 2 presented with reference to the prior art, the bay 1 is additional and is housed in the launch vehicle 2 at least temporarily, at the level of an equipment bay 16. No adapting of the launch vehicle 2 is required to house the bay 1. The bay 1 therefore has dimensions adapted for housing thereof inside the launch vehicle 2: typically a diameter of a few meters and height in the order of one meter. Aside from this difference, the launch vehicle 2 transporting the bay 1 at least temporarily conforms to the presentation given in the introductory part of the present application and it will not be further described for reasons for clarity and conciseness.

Figure 3:
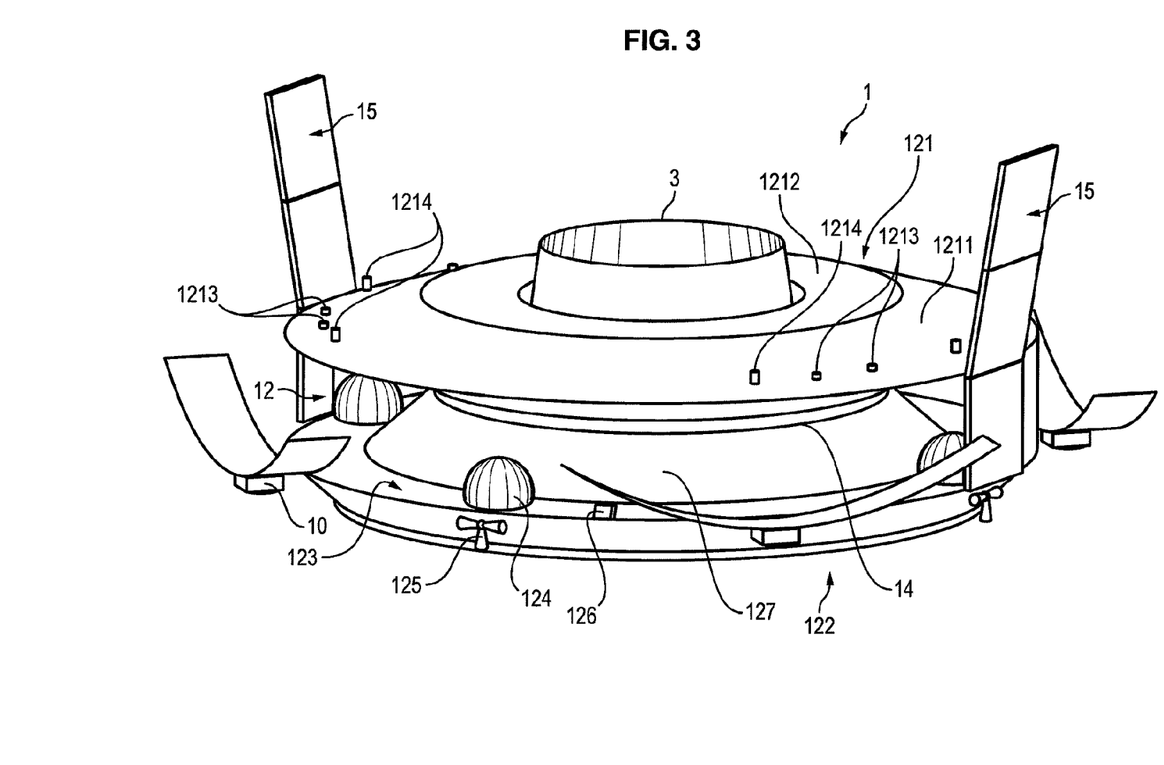
FIGS. 3 and 4 schematically illustrate views of a bay according to the invention, in perspective and partly transparent.
Figure 4:
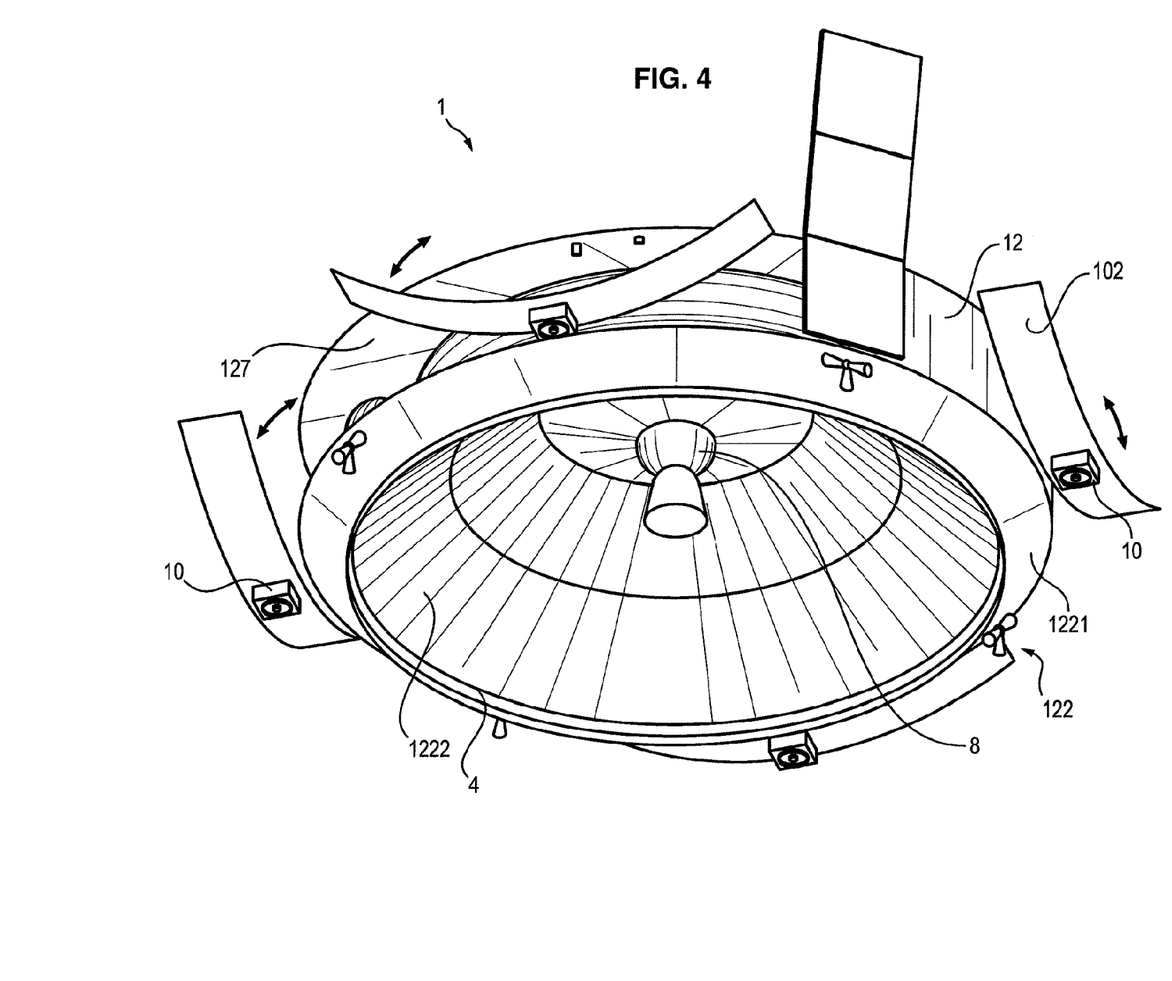

As shown in FIGS. 3 and 4, the bay 1 is of substantially flattened cylindrical shape and chiefly comprises a peripheral equatorial belt 12 forming a toroid having an inner space 127 and separating the bay 1 into two parts: namely an upper outer part 121 and a lower outer part 122.

Figure 5:
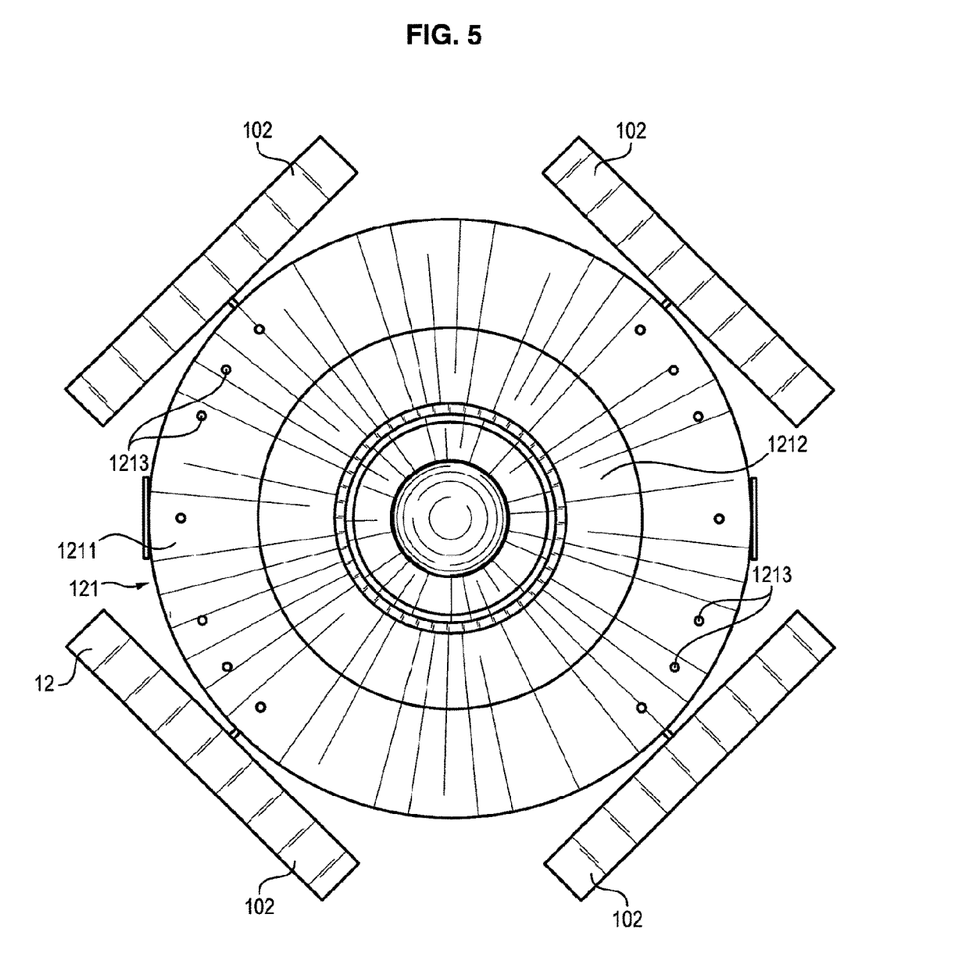
FIGS. 5 and 6 schematically illustrate an overhead view and underside view respectively of a bay according to FIGS. 3 and 4.
Figure 6:
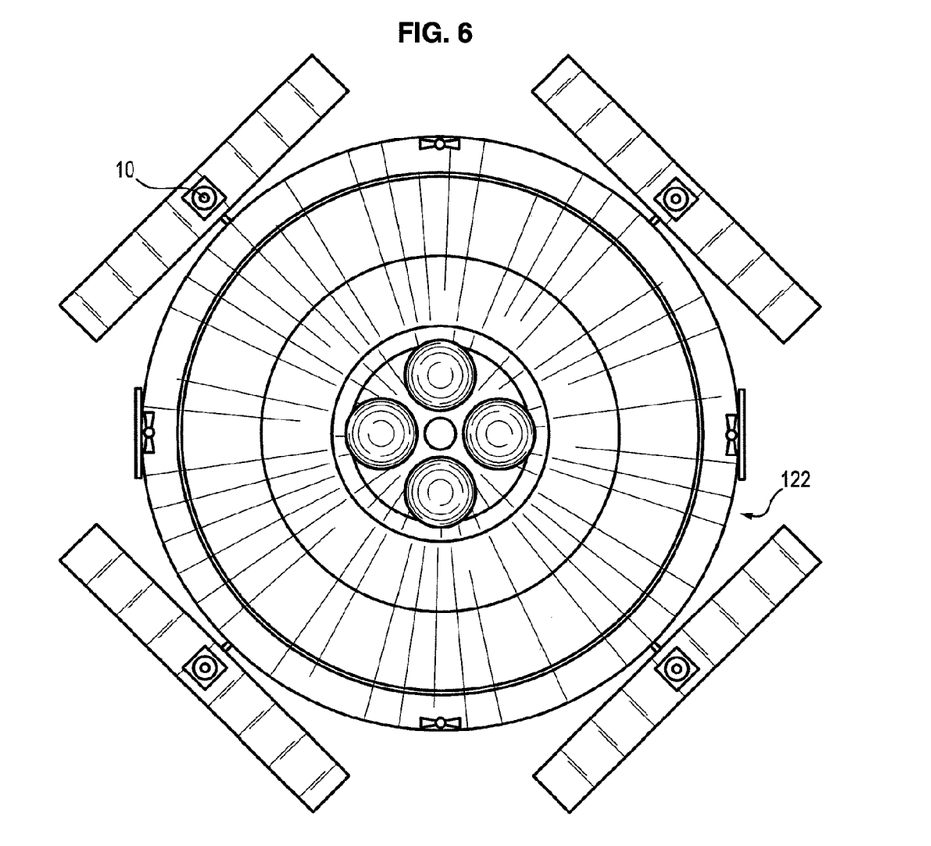

The upper outer part 121 can be seen more clearly in FIG. 5, and the lower outer part 122 can be seen in FIG. 6.

The inner space 127 in its lower peripheral part comprises a ring 123 forming an equipment-carrying platform e.g. a case 126 comprising an on-board computer to control and guide the bay 1.

The bay 1 therefore also comprises an electric power supply 15, most advantageously formed by solar panels 15 of low power e.g. 4 Kilowatts to power the case 126. The panels 15 are two in number for example, and arranged diametrically opposite each other on the periphery of the belt 12.

The bay 1 comprises engines 125 using liquid fuel e.g. monopropellant, and liquid fuel reservoirs 124 for the engines 125.

The engines 125 allow the providing of:

additional propulsion required for separating the bay 1 from the stage 23; and attitude control of the bay 1 for guiding thereof after the aforementioned separation.

The engines 125 are advantageously four in number and arranged at equidistance from one another on the periphery of the bay 1, to obtain redundancy of the engines 125 in the event of failure of one of the engines 125 and an efficient gimbal effect during attitude control.

The reservoirs 124 are advantageously spherical in shape and are carried by the ring 123 in space 127.

The bay 1 also mainly comprises an adapter 3, 4, 5 which cooperates with at least one system 6, 7 or 8 on board. The system 6, 7 or 8 is loaded on board the bay 1 at least temporarily.

According to one preferred embodiment, the adapter 3 is positioned at the level of the upper part 121.

Part 121 which can be seen more clearly in FIGS. 3 and 5 has an upper structure 1211 of substantially flattened cone shape on the periphery and flat in the central part.

The structure 1211 receives the adapter 3 in its centre, the adapter 3 being of conical shape projecting from the structure 1211, so that it cooperates by mating shape with at least a lower part of a first system 6 loaded on board the bay 1 at least temporarily.

Figure 9:
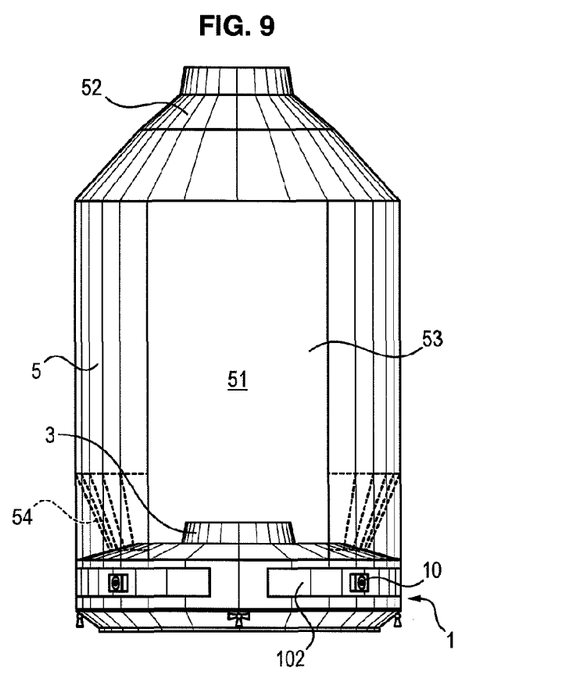
FIG. 9 schematically illustrates a side view of an adapter of a bay according to the invention.
Figure 10:
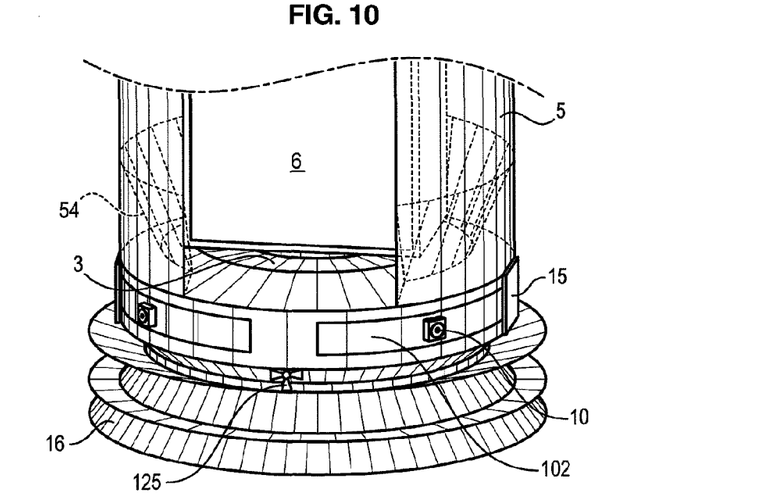
FIG. 10 schematically illustrates details of an adapter according to FIG. 9, in perspective and partly transparent.
Figure 11:
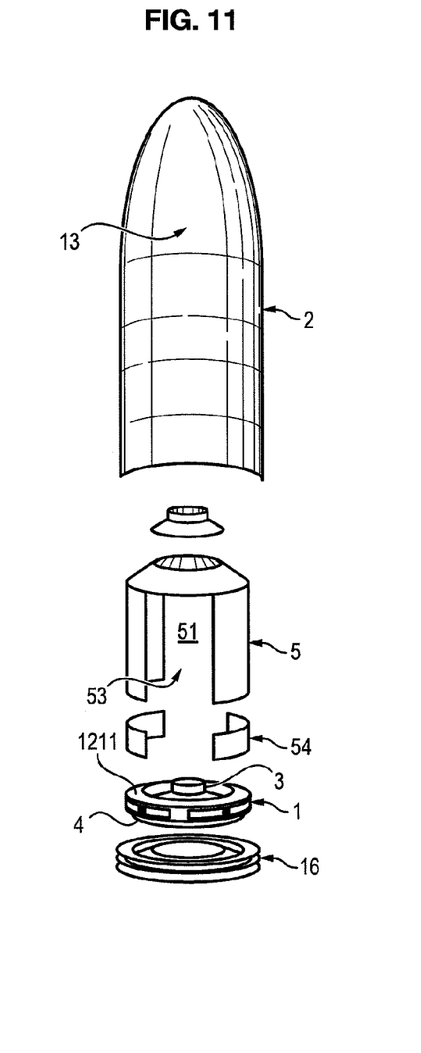
FIG. 11 schematically illustrates an exploded view of a possible adapter for a bay according to the invention.

As shown in FIGS. 9 to 11, the adapter 3 also comprises a carrier structure 5 of substantially cylindrical shape and having an inner space 51 to receive the first system 6 (see FIG. 10).

The carrier structure 5 also comprises one end 52 to cooperate with at least one second system 7 loaded on board.

Similar to that part of the adapter 3 positioned at the level of structure 1211, the end 52 is of conical shape and projects from the structure to cooperate via mating shape with a lower part of the second system 7 loaded on board.

As is fully conventional, the first system 6 forms an artificial satellite and/or the second system 7 forms an artificial satellite. In this respect, the first system 6 and/or the second system 7 comprise an electric power supply 9.

The bay 1 also comprises at least one electric space propulsion engine 10 adapted to be powered by the power supply 9 of system 6 or 7. Most advantageously, the engine 10 is powered solely by the electric power supply 9 of the first system 6 and/or of the second system 7. It will therefore be understood that there is mutualisation of resources within the launch vehicle owing to the use of the electricity power supply of a system loaded on board the bay to supply electric power to the aforementioned electric engine of the bay: the gain in weight on the bay can therefore be converted to an increase in the payload of the launch vehicle, in particular an increase in the weight of the systems loaded on board.

Figure 8:
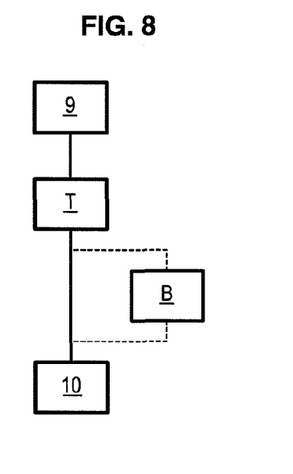
FIG. 8 schematically illustrates possible electric mounting for the electric powering, by a system on board the bay, of an electric engine of the bay according to one of FIGS. 3 to 6.

As shown in FIG. 8, the electric power supply 9 of a system on board is connected via an electric connection for transfer of electric power to the electric engine 10 of the bay 1 via an electric transformer T, either directly or via a battery B of the bay e.g. placed in the equipment bay 126. The transformer T can be positioned on a system on board or it may also be placed directly on the bay 1.

Figure 7:
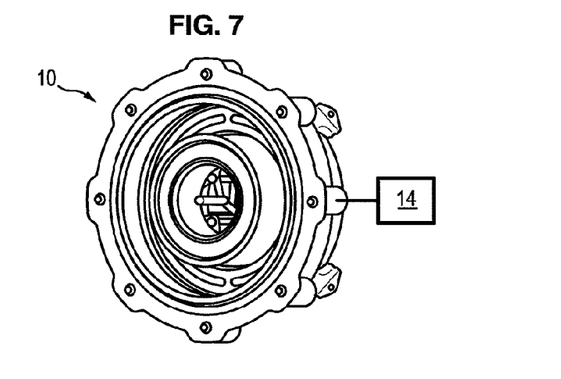
FIG. 7 schematically illustrates one possible embodiment of an electric space propulsion engine which can be used on a bay according to FIGS. 3 to 6.

As shown in FIG. 7, the electric space propulsion engine 10 is adapted to produce an electric/magnetic field and to cause space propulsion by expelling into space a fuel that is sensitive to the electric/magnetic field.

The bay therefore also comprises a fuel reservoir 14 e.g. or toroid shape and placed in the inner space 127 of the belt 12. The fuel may therefore be xenon, krypton or argon for example.

The engine 10 may also be of any type known to persons skilled in the art using for example:
  electrothermal propulsion; and/or
  electromagnetic propulsion (thruster of magnetoplasma dynamic type (MPD) or accelerator using Lorentz forces (LFA Lorentz force accelerator)); and/or
  ponderomotive force (Electrodeless Plasma Thruster—EIPT); and/or
  pulsed plasma propulsion (Pulsed Plasma Thruster—PPT); and/or
  ion propulsion (e.g. Field Emission Electric Propulsion—FEEP, bombardment ion thruster, radio-frequency ionisation thruster or Hall effect thruster (Stationary Plasma Thruster—SPT, Propulseur par Plasma pour Satellites—PPS, Anode Layer Thruster—ALT)).

Contrary to the liquid propellant offered by the engines 125 used for separation with the stage 23 and for flight phases requiring strong thrust, the propulsion of the electric engine 10 is relatively low-powered but it has large flexibility of use (stop/start mode at will) and high yield. The electric engine 10 is therefore advantageously used for phases requiring low thrusts but high precision and high yield for example, but not limited thereto, for final placing of an artificial satellite on orbit or to change the orbit of an artificial satellite.

As previously for the engines 125, the bay 1 preferably comprises four engines 10 positioned equidistant from one another on the periphery of the bay 1 to obtain redundancy of the engines 10 in the event of failure of one of the engines and efficient gimbal effect for attitude control of the bay 1 during the aforementioned phases.

As shown by the double arrows in FIG. 4, the engines 10 are mobile relative to the belt 12 between two positions, namely:
  a retracted position in which the engines 10 lies flat against the belt 12 to allow positioning of the bay 1 inside the launch vehicle 2 (the retracted position of the engines 10 can be seen for example in FIGS. 9 and 10); and
  a deployed position allowing propulsion of the bay when necessary as can be seen in particular in FIGS. 3, 4, 5 and 6.

As can be ascertained in FIGS. 3 and 4, the engine 10 comprises a support 102 whose shape mates with the shape of the belt 12, and also forms a heat sink element to allow cooling of the electric engine 10 if necessary.

As shown in FIG. 4 and FIG. 6 according to one preferred embodiment, as an alternative to the above-described embodiment or in addition thereto, the adapter 4 is positioned at the lower part 122.

The lower part 122 comprises a lower peripheral flattened cone structure 1221 partly convex, and a concave cone 1222 in its central part. The structure 1221 and the cone 1222 allow transmission of forces.

The cone 1222 in its centre receives the adapter 4 which is adapted to cooperate via matching shapes with a system on board e.g. a third system 8 on board advantageously forming an additional liquid or solid space propulsion system.

Figure 13:
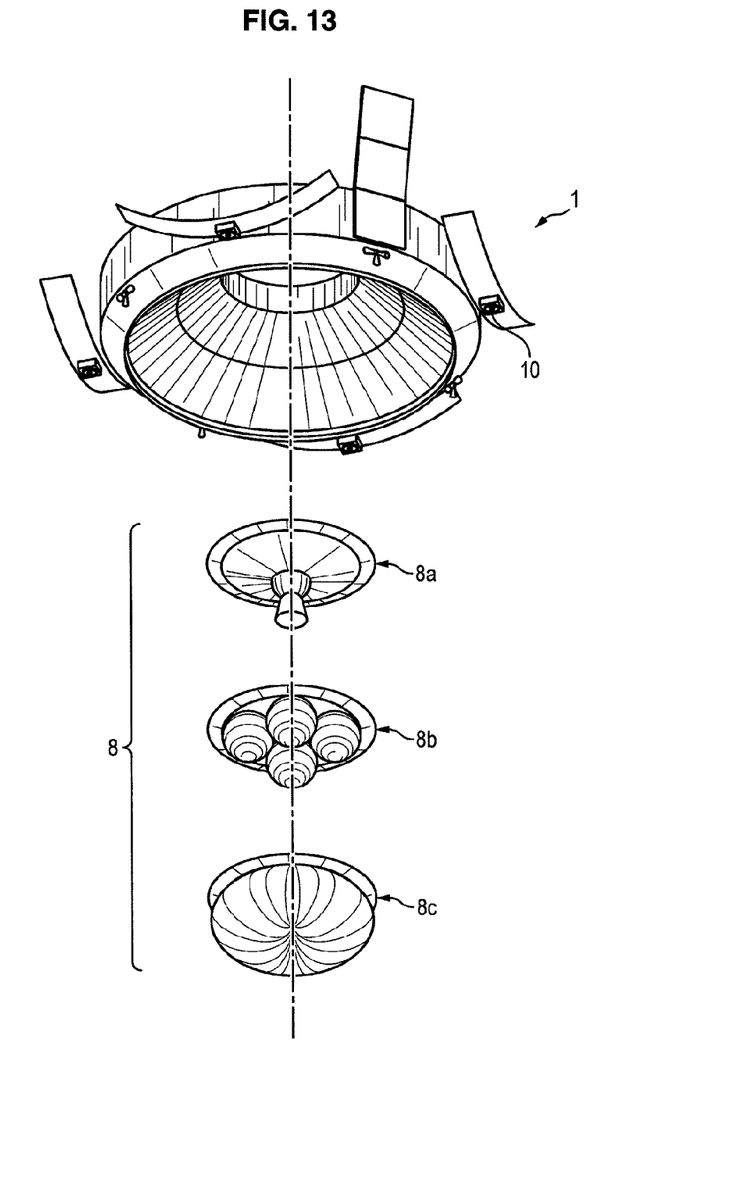
FIG. 13 schematically illustrates the possible options for a system on board, forming additional propulsion for the bay according to the invention.

As shown in FIG. 13, the third system 8 may be chosen to be one of the following types:
  known solid fuel propulsion 8a, or
  known liquid fuel propulsion 8b, or
    storable
    cryogenic
  known hybrid propulsion 8c with additional fuel reservoir 141 for the engine 10.

Similar to the liquid-fuelled propulsion offered by the engines 125, the propulsion offered by the third system 8 can be used for separation with stage 23 and for flight phases requiring strong thrust.

Figure 12:
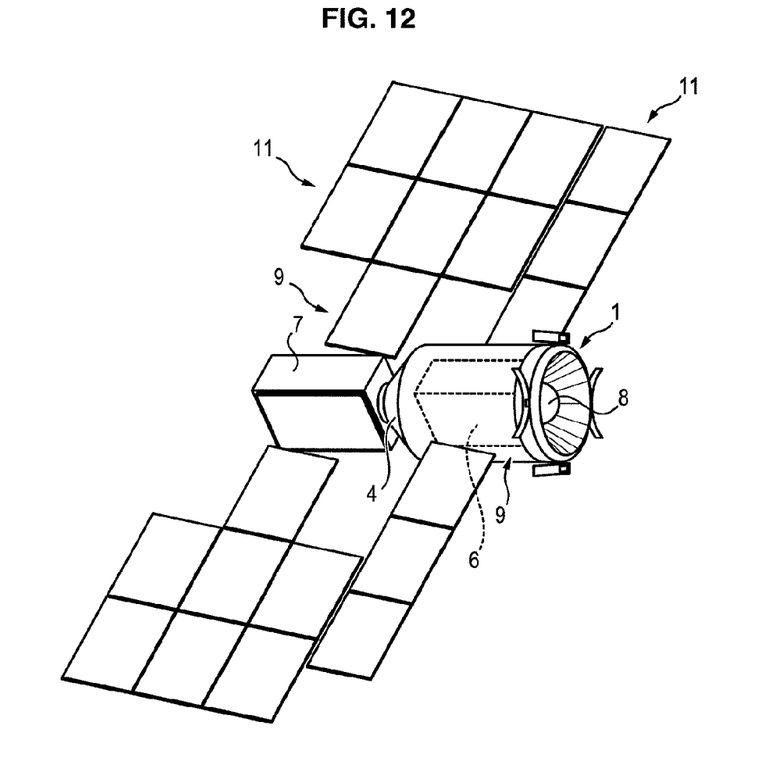
FIG. 12 schematically illustrates deployed solar panels of a power supply of systems on board a bay according to the invention.

As shown in FIG. 12, in the fully conventional case in which the first system 6 forms an artificial satellite and/or the second system 7 forms an artificial satellite, the electric power supply 9 comprises solar panels 11 positioned on the first system 6 and/or on the second system 7 and converting solar radiation to electric energy once deployed, intended in particular for the engine 10. The solar panels 11 may produce a power in the order of 20 kW.

As can be seen in FIG. 12, so that it is possible to deploy the solar panels 11 of the system 6 still in place on the adapter 3, 5, the carrier structure 5 is provided with openings 53 adapted for deployment of the solar panels 11 of the power supply 9.

To maintain the rigidity of the carrier structure 5, despite the presence of the openings 53, the structure 5 comprises reinforcements 54 positioned between a lower part of the carrier structure 5 and the upper structure 1211.

The reinforcements 54 may therefore be in the form of a lattice structure in rigid material e.g. triangular whose base bears upon the upper structure 1211.

Advantageously, in the fully conventional case in which the third system 8 forms an additional liquid or solid space propulsion system, the electric power supply 9 comprises a transformer T (as illustrated in FIG. 8 for example) which is adapted to convert the mechanical energy of liquid propulsion to electric energy for the electric engine 10.

According to one variant, the power supply 9 may comprise a nuclear generator instead of a thermal or solar generator, and it may be positioned for example at the systems 6 or 7.

Figure 14:
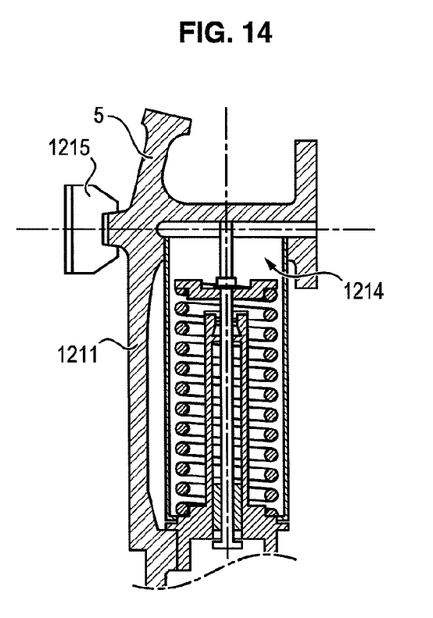
FIG. 14 schematically illustrates an elastic cylinder for the separation of a structure of the bay adapter from an upper part of the bay.

As is conventional, the structure upper 1211 also comprises elastic cylinders 1214 known per se and chiefly comprising a metal rod surrounded by a mechanical spring, held under elastic urging by means of pyrotechnic bolts 1213 and a peripheral belt 1215 also known per se. When the pyrotechnic bolts and the belt 1215 explode the cylinders 1214 are deployed and allow the mechanical separation of the structure 5 with structure 1211. Advantageously the bay 1 comprises four pairs of pyrotechnic bolts 1213 and six separation cylinders 1214.

It will be understood that the bay 1 may also comprise elements other than those described, for example landing gear positioned on the lower structure 1221 for some types of missions requiring landing of the bay 1.

The invention claimed is:

1. A propulsion bay configured to be transported at least temporarily in a space launch vehicle, comprising:
  an adapter which cooperates with at least one of a first, a second, or a third system loaded temporarily on the propulsion bay, said first, second, and third systems being removably engageable with said adapter, the adapter comprising a carrier structure having a substantially cylindrical shape and an inner space to receive the first system loaded in the carrier structure, the carrier structure comprising an end to cooperate with the second system, the adapter being adapted to cooperate with the third system forming an additional liquid or solid space propulsion system, each of the first, second, and third systems comprising an electric power supply; and at least one electric space propulsion engine adapted to be powered by the power supply of any of the first, second and third systems.

2. The bay according to claim 1, wherein the first system and/or the second system form artificial satellites configured to orbit in space.

3. The bay according to claim 2, wherein the carrier structure has openings adapted for deployment of solar panels of the power supply of the first system forming an artificial satellite, via the openings.

* * * * *